Nov. 28, 1933.    O. U. ZERK    1,937,051
WHEEL ATTACHING MEANS
Filed Dec. 16, 1931    2 Sheets-Sheet 2
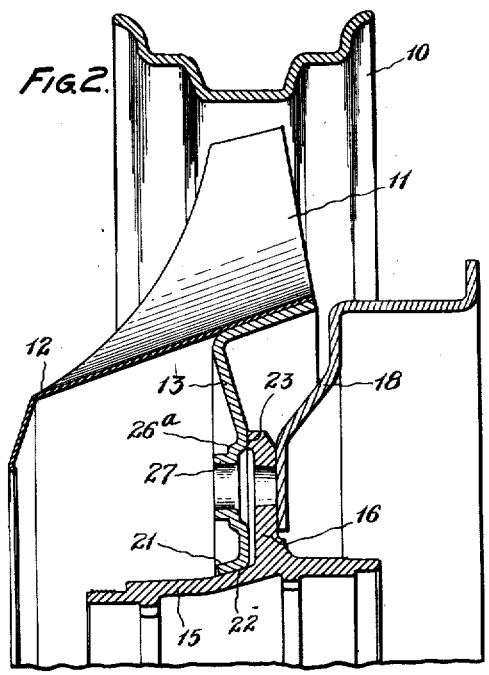
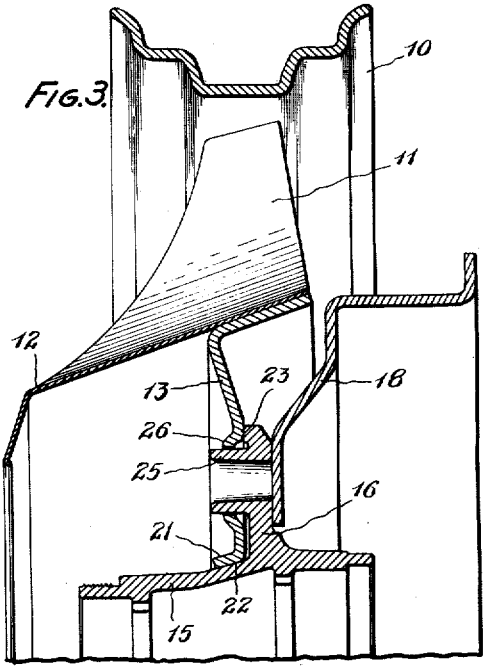
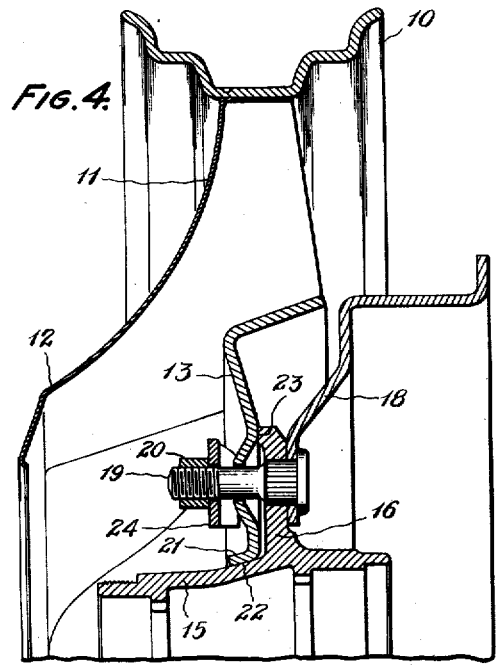
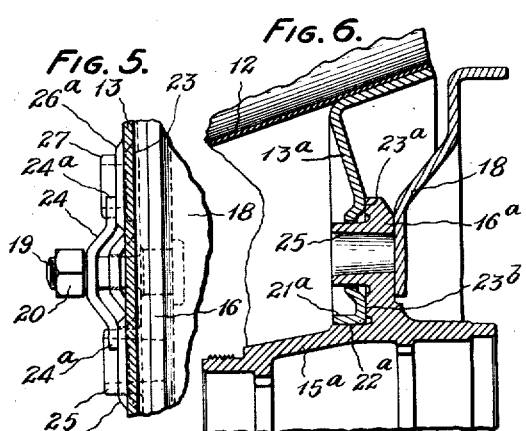
INVENTOR.
OSCAR U. ZERK
BY
ATTORNEYS Patented Nov. 28, 1933

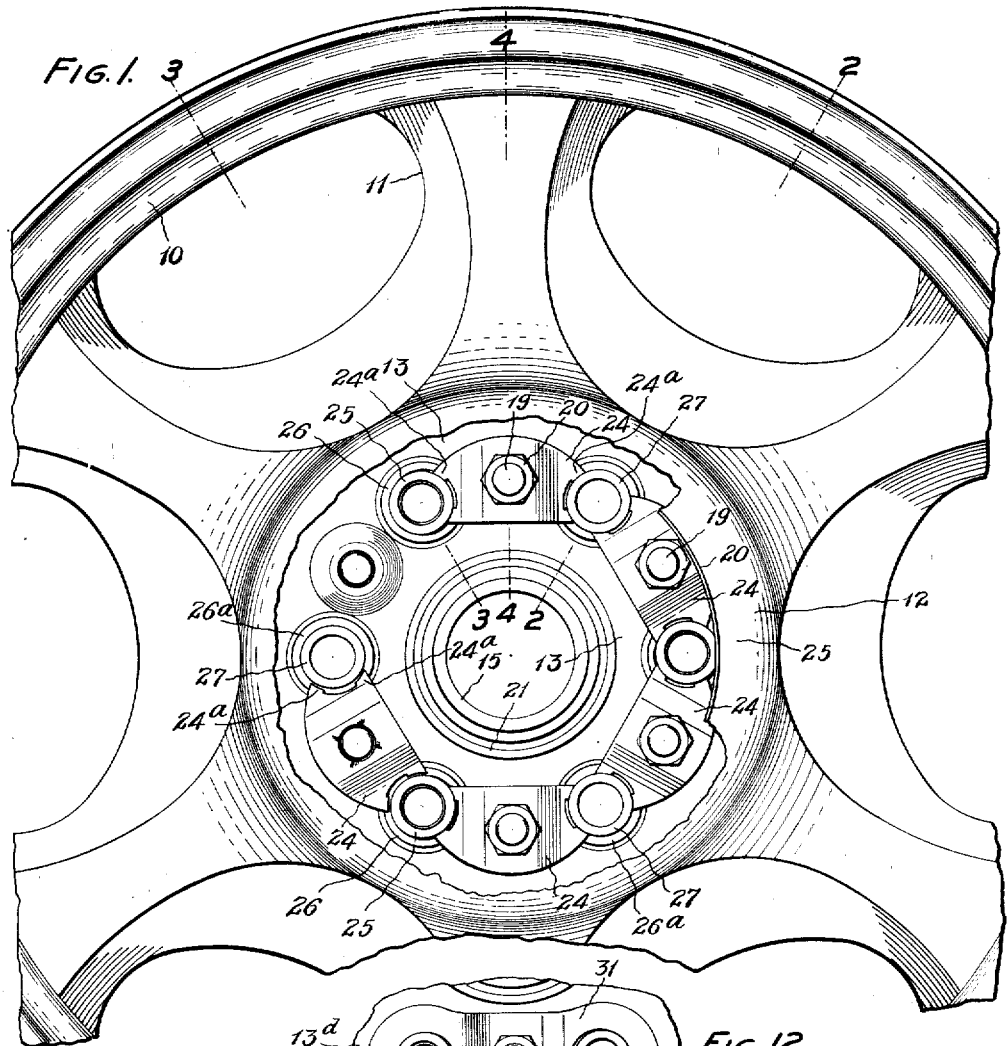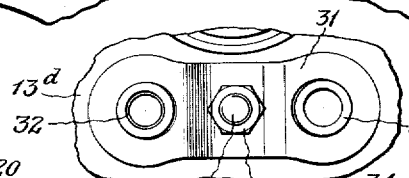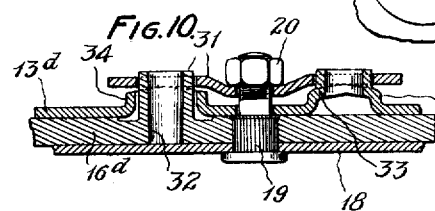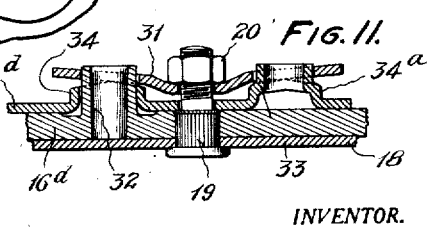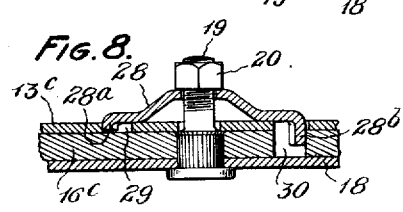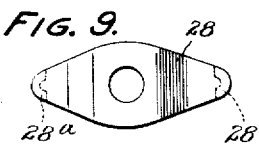

1,937,051

UNITED STATES PATENT OFFICE 1,937,051

WHEEL ATTACHING MEANS

Oscar U. Zerk, Cleveland, Ohio

Application December 16, 1931
Serial No. 581,399

13 Claims. (Cl. 301—9)

This invention relates to hub detachable wheels, especially automobile wheels, and relates particularly to improved wheel attaching means.

Heretofore, it has been customary to clamp the wheel flange to the hub flange by means of a plurality of radially arranged bolts and nuts. The bolts alone have been found to be insufficient to secure the wheel rigidly to the hub so as to eliminate relative movement of these parts. This has been due in part to the fact that the holes in the wheel flange fitted loosely over the bolts in the hub flange. Various means have been employed to eliminate the movement between the wheel and the hub and to relieve the bolts of the stress of supporting the weight imposed on the wheel, and, in addition, the driving stresses to which the bolts are subjected, as when the vehicle is started or stopped.

One method which has been employed is to provide conical depressions surrounding the bolt holes in the wheel flange, and to use nuts having conical faces which fit into the depressions in the wheel flange. With another method, there are employed conical projections on the wheel flange with cooperating conical depressions in the hub flange. When the wheel is fastened in place, the depressions in the hub flange fit over the projections on the wheel flange and help to relieve the bolts of the stresses to which they would otherwise be subjected. However, due to inaccuracies in manufacture, the centers of the bolts and the conical depressions employed in the first method have not coincided, while the same thing has been true of the conical projections and depressions employed in the second method. This resulted in a point contact instead of a surface contact between the various contacting members. Under the first method, rapid wear resulted at the point of contact as the contacting area was quite small, and as a result of the wear the wheel became loose. Under the second method, the inaccuracies in manufacture caused the wheel to be held in an angular plane, so that the wheel "wobbled" as it turned.

It is an object of the present invention to provide novel means to detachably secure wheels to their hubs.

A further object is to provide securing means by which the bolts will be relieved of the stress of the driving torque.

Another object of the invention is to provide securing means in which the bolts are relieved of the stress of supporting the weight resting on the wheel.

A further object of the present invention is to provide securing means for detachable wheels which will insure that the wheel will be held so that it will not wobble.

A further object of the present invention is to provide wheel securing means incorporating members which will adjust themselves so as to overcome inaccuracies of manufacture in the various parts.

A further object of the present invention is to provide wheel securing means which is simple and economical in construction, and which will securely fasten the wheel to the hub.

Other objects of the invention and features of novelty will be apparent from the following description taken in connection with the accompanying drawings, in which:

Figure 1 is a front view of one form of detachable wheel fitted with the securing means provided by my invention, certain parts being removed, and certain parts being broken away to more clearly reveal other parts;

Fig. 2 is a sectional view taken along the line 2—2 of Fig. 1;

Fig. 3 is a sectional view taken along the line 3—3 of Fig. 1;

Fig. 4 is a sectional view taken along the line 4—4 of Fig. 1;

Fig. 5 is a fragmentary side view showing one of the torque transmitting clamps in position;

Fig. 6 is a view similar to Fig. 3, but showing a slightly different form of hub and wheel flange construction;

Fig. 7 is a view similar to Fig. 3 but disclosing a still different form of hub and wheel flange construction;

Fig. 8 is a view similar to Fig. 5, but showing a different form of clamp or torque transmitting member;

Fig. 9 is a front view of the clamp shown in Fig. 8;

Fig. 10 is a view similar to Figs. 5 and 8, showing a further modification, this view showing the clamp before the nut is tightened;

Fig. 11 is another view of the same, showing the clamp after the nut is tightened; and Fig. 12 is a face view of the same.

In the drawings, I have illustrated my invention applied to a sheet metal spoke wheel of the general type disclosed and claimed in my prior applications Serial No. 554,482 filed August 1, 1931, Serial No. 560,162 filed August 29, 1931, Serial No. 561,541 filed September 8, 1931, and Serial No. 562,315 filed September 11, 1931. In all these applications I have disclosed hub demountable wheels having a star-shaped sheet metal body consisting of a plurality of substantially U-shaped spokes which are integral with and at their inner ends merge into an outer hub portion of the wheel body. That is to say, the wheel body is composed of a sheet metal spoke and outer hub unit, the spokes being attached at their outer ends by suitable means, as by welding, to the rim, and the outer hub portion of the sheet metal unit or wheel body being provided with a wheel attaching flange which is adapted to be secured to the flange of an inner hub. Only this very brief description of the wheel and particularly the wheel body is herein given as this subject matter herein briefly referred to and as modified in various ways is more fully disclosed and claimed in my prior applications above specified. It is to be understood, however, that the present invention is not confined to this type of wheel but is adaptable for all types of hub demountable wheels.

The wheel herein illustrated is provided with a rim 10 and spokes 11 forming a part of the sheet metal unit referred to above and formed integral with the outer hub portion 12 of the unit. As explained in my prior applications, this outer hub portion extends laterally outward beyond the plane of the rim (the spokes flaring laterally outward to near the outer end of the outer hub portion) and is continuous at its outer end only. Inwardly of the outer continuous end portion, the outer hub is formed by the concavo-convex portions of the sheet metal unit which lie between the spokes, these portions being alternated with openings extending lengthwise of the spokes. It is to be remembered, however, that the present invention is not confined to this type of wheel for the reasons explained above.

Regardless of the type of wheel to which my invention is applied, such wheel will have a suitable attaching portion which is designed to be removably secured to a flange of the inner hub. With the type of wheel herein illustrated, this wheel attaching portion is in the form of a flange which is designated 13 in the form of the invention illustrated in Figs. 1 to 4, this flange being preferably a stamping which is secured, as by welding, to the outer hub portion 12. The inner hub, designated 15 in Figs. 1 to 4, has a radial flange 16 to which the flange 13 is adapted to be secured in the manner hereinafter explained. In the construction illustrated, a brake drum 18 is secured to the inner face of the radial flange of the inner hub, while the wheel is attached to the outer face of the flange.

With all forms of my invention, the wheel attaching flange 13 is secured to the outer face of the inner hub flange 16 by radially disposed, equally spaced bolts 19 and nuts 20, the bolts being preferably carried by the inner hub flange 16 and extending through openings in both members, the bolt holes or openings formed in the attaching flange 13 being somewhat larger than the bolts.

It is characteristic of the present invention that the bolts are relieved of the load and driving stresses in a very novel manner, which will be explained presently. Preferably, the load stresses are transmitted independently of the bolts directly to the inner hub by the engagement of the inner peripheral portion of the wheel attaching member 13 with the body of the hub, this being accomplished by providing at the inner periphery of the wheel attaching member an outturned flange which engages a suitably machined seat on the body of the inner hub 15 just forwardly of the radial flange 16. In the form of the invention illustrated in Figs. 1 to 4, the flange 21 is a conical flange which engages a correspondingly tapered or conical seat 22 on the hub. When the wheel is attached to the hub, the flange 21 is pulled tightly against the seat 22 and at the same time the attaching member 13 outwardly of the bolts 19 is held against an annular seat 23 near the outer periphery of the hub flange 16. I might here state that it is not necessary that the flange at the inner periphery of the attaching member and the engaging surface of the body of the hub be conical, as these parts may be cylindrically disposed, as embodied in another form of the invention, and, in fact, in some instances it is not necessary that the inner peripheral portion of the wheel attaching member engage the body of the hub at all, as will be explained.

Taking up now the means by which the wheel is attached to the hub with the bolts 19 relieved of the driving or both the driving and load stresses, it is a feature of the invention in all its different forms that the torque stresses, due to sudden starting or stopping, are transmitted from the wheel attaching flange to the inner hub flange, or vice versa, by yieldable or adjustable torque transmitters preferably in the form of a series of expansible clamps which may be powerful spring clamps which loosely surround the bolts just inside of the nuts and at their ends having firm engagement with portions of the inner hub flange and wheel attaching flange respectively. This is accomplished in somewhat different ways with the various forms of the invention herein illustrated.

In the embodiment of this part of my invention illustrated in Figs. 1 to 7, the torque transmitting clamps, designated 24, have central bolt openings slightly larger than the bolts and are mounted on the bolts just inside of the nuts, as stated above, and at their ends engage projections, in this instance tubular projections, arranged or formed alternately on the wheel attaching flange and inner hub flange respectively. These projections on both flanges are preferably cylindrical and hollow and are also preferably of the same outside diameter, but they need not be either cylindrical or hollow. The tubular or cylindrical projections on the inner hub flange are designated 25 (see particularly Fig. 3), these projections extending through openings in the wheel attaching flange 13, which openings are slightly larger than the outside diameter of the tubular projections 25 and are preferably formed centrally of bosses 26 pressed outward in the flange 13. The tubular projections on the wheel attaching flange 13 which are alternated with the projections 25 on the inner hub flange are designated 27, these projections having at their bases or inner ends bosses 26a similar in size and height to the bosses 26. These projections 27 and the openings formed in the wheel attaching flange for the projections 25 are arranged alternately on opposite sides of the openings formed in the wheel attaching flange for the attaching bolts 19, and in fact the axes of the projections 27 and of the openings for the projections 25 and the axes of the openings for the bolts 19 are arranged alternately in the wheel attaching flange equal distances apart. That is to say, on opposite sides of each bolt 19 there is are two cylindrical projections of equal size, one being on the inner hub flange and projecting forwardly through an opening in the wheel attaching flange, and the other projecting forwardly the same distance but being on the wheel attaching flange.

As herein illustrated, six attaching bolts 19 are employed. Accordingly, the inner hub flange and the wheel attaching flange each have three tubular projections arranged thereon 120° apart. Of course the number of projections on each flange will depend upon the number of bolts, and it will be understood that the number of bolts and therefore the number of projections which are provided on the two flanges may be varied.

Referring again to the clamps, each clamp is substantially rectangular in form, though not entirely rectangular as the ends and also preferably the outer edge are curved. The center portion and the end portions of each clamp, as here shown, are flat and substantially parallel, while the intermediate portions are preferably at an included angle of about 120°. The ends of the clamps are concavely formed or cut out on a radius equal to the radius of the outside cylindrical surface of the projections 25 and 27, and the center portions of the concavely formed ends of the clamps are further cut out or inset, leaving two contacting portions or areas 24a at each end of each spring clamp.

The clamp is designed so that when not under stress its total length is less than the distance between two adjoining tubular projections (when the wheel is fitted onto the hub). Therefore, in applying the wheel to the hub, the wheel is slid onto the latter, and, in so doing, the projections 25 on the hub flange and the bolts 19 are of course extended through the openings formed in the wheel attaching flange for these parts, and since the clamps are normally shorter than the distance between adjacent tubular projections, the clamps can be applied with the greatest ease.

After all the clamps are placed on the bolts, the nuts 20, which it will be observed are plain and not of special construction or form as heretofore required, are screwed onto the ends of the bolts 19. As the nuts are tightened, they press against the center portions of the clamps and expand or lengthen them so as to take up all play between the clamps and the tubular projections at the ends thereof. Assuming that the wheel is held immovably and therefore that the three projections on the wheel attaching flange are stationary, while the projections on the inner hub flange are movable, when the nuts are finally screwed tight with the contacting areas at the ends of the clamps biting into the tubular projections, the relatively movable tubular projections 25 on the inner hub flange will be immovably held in the openings for these projections formed in the wheel attaching flange.

It is immaterial to the present invention whether the projections formed on the inner hub flange are held out of contact with the metal walls forming the openings provided in the wheel attaching flange for these projections or whether the projections on the hub flange are held by the clamps in engagement with the walls of the openings. In either event, they are held immovably in the openings by the torque transmitting members or clamps and are relieved of torque stresses, and whether they are out of contact with the walls of the holes or not will depend largely on the manner in which the nuts 20 are tightened. If the nuts on all the different bolts are tightened more or less gradually and progressively around the hub, the clamps pressing against opposite sides of the tubular projections of the inner hub flange will hold these projections somewhat centrally of the holes in the wheel attaching flange. On the other hand, if the operator, in securing the wheel, will tighten the first nut and therefore expand the first clamp to its greatest extent, and do this successively around the hub, the projections on the hub flange will very likely engage the metal walls of the openings in the wheel attaching flange or member. It is immaterial to my invention which condition prevails, and it is a feature of the invention that the full advantage of the torque transmitting characteristics of the clamps is obtained regardless of the manner in which the wheel is applied in so far as the way in which the different nuts are tightened and the different clamps are expanded.

It is obvious that the clamps should have sufficient play on the bolts to allow the maximum expansion of the clamp without the wall of the opening in the clamp coming into engagement with the wall of the bolt. Otherwise the bolt might stop or prevent the clamp from expanding the full extent desired. If will be understood, of course, that the clamps are individually able to adjust themselves to compensate for inaccuracies, and this compensation takes place automatically as the various clamps are expanded.

It will be noted that when the nuts are tightened, I get a four-point contact between the clamp and the two projections which it engages. This is very important because in this way the entire tendency for relative movement between the wheel attaching flange and the inner hub flange is eliminated. Ordinarily, an even contact can only be achieved in a rigid or semi-rigid manner at three points or places, but in this instance the four-point contact is obtained in the following manner. When the clamp, before its entire expansion, rests against the immovable projection, it will engage it at two places, and when the clamp expands and contacts at its other end with the other tubular member, it will generally first engage the last mentioned tubular projection at one of the contacting areas only, but as the tightening of the nut is continued, the clamp will turn about the center of the immovable tubular projection until both contacting areas at the end of the clamp adjacent the other tubular projection uniformly engage the surface of this projection, resulting in a four-point contact between the two adjoining cylindrical members and the clamp between them.

The clamps are preferably made of heavy tempered spring steel because they take up the entire driving stresses, three of them serving to absorb the stresses due to sudden starting or stopping in one direction and three in the opposite direction, the three clamps in each instance acting in series to perform this function. It might be here mentioned that the clamps have a further advantage in that they also act as exceedingly powerful lock washers in preventing the nuts 20 from loosening.

In tightening the nuts and flattening the clamps as above stated, the wheel fastening flange 13 is pressed against the inner hub flange 16, this pressing action being first done by spring action, due to the resiliency of the several clamps. This resilient action lasts only until the ends of the clamps embed themselves in the two projections with which they contact. When this occurs, the clamps are not only in tight engagement with the tubular projections but also press tightly agains the wheel fastening flange by their engagement with the bosses 26 and 26a which are formed in the wheel attaching flange around the tubular projections 27 and around the openings for the projections 25 on the inner hub flange and thus press the wheel tightly against the hub flange. When this tight engagement is formed, the parts cannot be pressed together any more tightly, nor can the wheel fastening flange move in the direction of the nuts because of the tapered portions of the clamps and the fact that the latter are expanded the maximum amount.

As stated above, when the nuts are tightened the conical flange 21 at the inner periphery of the wheel attaching member bears solidly on the tapered or conical seat 22 of the hub and the wheel attaching member also abuts solidly against the annular surface 21 so that the wheel is held not only immovably on the body of the hub and against the flange 16 but accurately without likelihood of wobbling. It will be apparent that the bolts are relieved of load stresses by the direct engagement of the conical portions of the wheel attaching flange and hub, it being understood, of course, from what has already been stated, that they are relieved of the driving stresses by the clamps.

Although the interengaging portions of the wheel attaching member and hub body may be conically formed, as illustrated in Figs. 2, 3 and 4, this is not essential as these portions may be cylindrically formed, as in Fig. 6. In this figure, the wheel attaching flange is designated 13a and the inner hub is designated 15a, the former having at its inner periphery a cylindrical outturned flange 21a and the hub body having a cylindrically formed seat which is engaged by the flange 21a when the wheel is placed on the hub. With this construction, when the nuts on the attaching bolts are tightened, the clamps, which act as before, press the attaching flange solidly against two annular surfaces or seats, one, designated 23a, being near the outer periphery of the flange and corresponding to the seat 23 of the construction first described, and the other designated 23b being near the inner periphery of the flange. Here, as before, the direct engagement of the flanged inner periphery of the wheel attaching member with the body of the hub relieves the bolts of the load stresses, while the clamps relieve them of the driving stresses. The construction is otherwise the same as that first described, and this figure, therefore, needs no further description.

I do not regard it essential that the wheel attaching member be extended inwardly so as to engage or seat upon a portion of the hub body so as to transmit to the inner hub body the load stresses. That is to say, the clamps may be utilized to relieve the bolts of the driving stresses and the load stresses as well, or at least the major portion of the load stresses. By reason of the fact that the clamps engage the tubular projections on the wheel attaching member and inner hub flange inwardly of the centers of these projections, as well as outwardly thereof (see Fig. 1), the clamps are capable of transmitting to the hub the load stresses, provided they are not too severe. This construction, which is especially adapted for wheels intended for the smaller cars, is illustrated in Fig. 7 wherein the wheel attaching flange is designated 13b and the inner hub 15b. As will be seen from this figure, the wheel attaching flange is pressed up against the inner and outer annular seating portions 23c and 23d of the inner hub flange 16b, but the inner periphery of the wheel attaching flange does not bear against the body of the hub. The clamps will be applied to this construction the same as in that previously described, and these clamps will function like those first referred to, with the exception that they relieve the attaching bolts 19 (not shown in Figs. 6 and 7) of both driving and load stresses.

My invention may be modified still further in so far as the form of the clamp is concerned, and the manner in which engagement is made between the ends of the clamp and the wheel attaching member and inner hub flange respectively, and in Figs. 8 and 9 I have shown an embodiment in which changes in the parts or in the respects stated are incorporated. In the construction here illustrated, the wheel attaching flange is designated 13c and the inner hub flange is designated 16c. The clamp, which is designated 28, is in this instance mounted on the attaching bolt, as before, and is formed like the clamp 24 of the constructions first described except that it is somewhat diamond-shaped in plan view and at its ends has inturned portions 28a and 28b, the latter being longer than the former. The engagement between the ends 28a and 28b of the clamp and the wheel attaching flange 13c and the inner hub flange 16c is accomplished by providing openings in the wheel attaching flange and in the inner hub flange and causing these inturned ends of the clamp to be extended thereinto. In Fig. 8 the opening in the wheel attaching flange 13c is designated 29, this opening receiving the shorter inturned end 28a of the clamp 28 and aligned openings formed in both the wheel attaching flange and the inner hub flange for the longer inturned end 28b of the clamp are designated 30. As the nut on the bolt is tightened, the clamp is flattened precisely as before and expanded in length, and in so doing the shorter end will bear against the wall of the opening 29 in the wheel attaching flange and the longer inturned end will bear against the wall of the opening 30 in the inner hub flange, the aligned opening in the attaching flange being somewhat wider than that formed in the wheel attaching flange so that the long inturned end will bear only against the wall of the opening in the inner hub flange, as clearly shown at the righthand side of Fig. 8. It will be understood that similar openings will be provided for each of the six (more or less) clamps and that when the nuts are tightened, the rounded inturned ends of the clamps will solidly engage against the two members so as to transmit the driving stresses from one member to the other and relieve the bolts of these stresses in substantially the same way as before.

It is not essential to the invention that the torque transmitting clamps described above be formed from spring material or, in fact, that they be in the form of "spring" clamps. It is only important that they be capable of expanding or lengthening as the nuts are tightened, but this characteristic is obtainable in different ways, as, for example, by forming them of articulated members which will have something of a toggle action under pressure of the nut. However, for the sake of simplicity, these torque transmitting members are formed from one piece of spring material.

While the clamps shown in the preceding figures expand and lengthen as the nuts are tightened, as explained above, in which event they are under very severe compression after the wheel is secured in place, I may employ torsion transmitting clamps which are actually under tension when the nuts are tightened, and this construction I have shown in Figs. 10 and 11. In these figures, the wheel attaching flange is designated 13d and the inner hub flange 16d. Bolts 19 with nuts 20, similar to those previously employed, will be utilized to fasten the wheel flange to the inner hub flange, and associated with at least part of the bolts are clamps 31. These clamps may be substantially flat when in their normal condition before the nuts are tightened, or they may have a central depression, as shown in Fig. 10. Each has a central opening to receive the bolt 19, which opening is of course larger than the external diameter of the bolt, and each one is provided near its ends with openings which are fitted onto projections 32 and 33 formed respectively on the inner hub flange 16d and on the wheel attaching flange 13d. Each projection 32 on the inner hub flange extends loosely through an opening in the wheel attaching flange 13d. When the clamps are first applied, the ends of the projections 32 and 33 extend loosely in the openings provided in the end portions of the clamp, and the portions of the clamps around these openings bear against shoulders 34 and 34a formed on the wheel attaching flange around the openings. When the nuts are tightened, the central portion of the clamp is bent inwardly, as indicated in Fig. 11 in somewhat exaggerated manner, and as it is bent inwardly, the outer ends of the clamp are drawn inwardly toward the bolt and it takes up all play between the projections and the holes in the clamp for these projections and pulls the projections toward each other, and, at the same time, by engagement of the clamp with the shoulders 34 and 34a, the wheel attaching flange is clamped tightly against the inner hub flange. Thus, with this form of the invention, wherein the torque transmitting members or clamps are under tension when the nuts 20 are tightened the full amount and the wheel is thus securely fastened to the hub, the bolts are relieved of all torsional stress, as before. With this construction, one pair of projections 32 and 33 will be used for each clamp 31, in which event it may be desirable to have a smaller number of clamps than bolts 19. For example, there may be half the number of clamps as bolts, in which event there will be three pairs of clamps and pairs of projections 32 and 33 when six bolts are employed, a clamp being fitted on alternate bolts. However, a clamp of this type may be employed with each bolt.

The operation and functioning of my improved wheel attaching means, with the various modifications in the way in which the wheel is supported as well as in the means for securing the wheel in place, will be understood from the foregoing description, and it will be sufficient to here state that by the constructions described the advantages and objects set forth in the early part of the specification are attained very effectively.

The structure may be modified in still other respects without sacrificing, at least to any material extent, the advantages above explained, and I therefore do not desire to be confined to the precise details of construction and arrangements of parts, but aim in my claims to cover the invention in its broadest aspects.

Having thus described my invention, I claim:

1. In a wheel, a hub member and a wheel member, and means for attaching said members together including bolts passing through the members, nuts on the bolts and combined nut locks and torque transmitting clamps engaged by the nuts and arranged between the latter and the wheel member and having torque transmitting engagement with both members.

2. In combination, a hub having a substantially radial flange with a plurality of laterally extending projections on one face thereof, a wheel adapted to be detachably secured to said hub flange, said wheel being provided with laterally extending projections located between but spaced from said first mentioned projections, and means for transmitting torque loads from one set of projections to the other set.

3. In combination, a hub having a substantially radial flange with a plurality of laterally extending projections, a wheel adapted to be detachably secured to said hub flange, said wheel being provided with laterally extending projections located between said first mentioned projections, bolts extending between the wheel and the hub flange, and members engaging adjacent projections to transmit torsional loads therebetween.

4. In combination, a hub having a flange with a plurality of projections, a wheel adapted to be detachably secured to said hub flange, said wheel having openings through which said projections extend and having projections located between said first mentioned projections, all said projections having exposed portions on the outer side of the wheel, bolts extending between the hub flange and the wheel, and members engaging adjacent projections to transmit torsional loads from one set to the other.

5. In combination, a hub having a flange, a wheel having a flange adapted to abut said hub flange, bolts detachably securing the wheel on the hub, and expansible torque transmitters mounted on said bolts on the outer side of the wheel flange and engaging both the hub flange and the wheel flange.

6. In combination, a hub having a flange with a plurality of projections on a face thereof, a wheel having projections located between said first mentioned projections, bolts extending between the hub flange and the wheel, and wheel clamping torque transmitters fitted on the bolts and engaged by nuts on the bolts, said torque transmitters each engaging adjoining projections on the hub flange and the wheel respectively.

7. In combination, a hub having a flange with a plurality of projections on a face thereof, a wheel adapted to be detachably secured to the hub, said wheel having projections located between the projections on the hub flange, securing members extending through the wheel and the hub flange, and torque transmitters associated with the securing members and adapted to engage said projections and also a face of the wheel.

8. In combination, a hub, a wheel adapted to be demountably secured to the hub, the wheel and hub both having projections, the projections on one member occurring between those of the other and both sets having exposed portions on the outer side of the wheel, and stress transmitting members extending between and engaging the exposed portions of adjoining projections.

9. In combination, a hub, a wheel adapted to be demountably secured thereto, bolts for securing the same together, cylindrical projections on the wheel and hub having exposed portions lying in the same plane on the outer side of one of said members and the projections on one member being alternated with those on the other, and torque transmitters extending between and held in firm engagement with adjoining projections.

10. In combination, a hub member, a wheel member adapted to be demountably secured thereto, means for securing them together, the hub and wheel members having laterally extending projections lying in the same plane and those on one member alternating with those on the other, and torque transmitters having concave ends held in firm engagement with adjoining projections on the other side of one of said members.

11. In combination, a hub, a wheel, bolts demountably securing the two together, and means for relieving the bolts of driving stresses comprising projections on the wheel and hub lying in the same plane and those on one member alternating with those on the other, and torque transmitters each having two contacting areas at both ends, which contacting areas are held in firm engagement with adjoining projections.

12. In combination, a hub, a wheel, bolts demountably securing the wheel to the hub, means for relieving the bolts of driving stresses comprising tubular projections on the hub extending loosely through the wheel and tubular projections on the wheel lying between those on the hub, and torque transmitters loosely mounted substantially centrally of the bolts inside of nuts on the bolts, and expanded by said nuts so that the outer ends of each clamp tightly grip two adjoining projections.

13. In a wheel, a hub and a wheel body, and means for fastening the wheel to the hub comprising bolts and torque transmitting members associated with the bolts and in engagement with both the hub and the wheel body, said torque transmitting members being under tension when the nuts on the bolts are tightened.

OSCAR U. ZERK.

CERTIFICATE OF CORRECTION.

Patent No. 1,937,051.     November 28, 1933.

OSCAR U. ZERK.

It is hereby certified that error appears in the printed specification of the above numbered patent requiring correction as follows: Page 6, line 13, claim 10, for "other" read outer; and that the said Letters Patent should be read with this correction therein that the same may conform to the record of the case in the Patent Office.

Signed and sealed this 9th day of January, A. D. 1934.

F. M. Hopkins (Seal)     Acting Commissioner of Patents.

members and the projections on one member being alternated with those on the other, and torque transmitters extending between and held in firm engagement with adjoining projections.

10. In combination, a hub member, a wheel member adapted to be demountably secured thereto, means for securing them together, the hub and wheel members having laterally extending projections lying in the same plane and those on one member alternating with those on the other, and torque transmitters having concave ends held in firm engagement with adjoining projections on the other side of one of said members.

11. In combination, a hub, a wheel, bolts demountably securing the two together, and means for relieving the bolts of driving stresses comprising projections on the wheel and hub lying in the same plane and those on one member alternating with those on the other, and torque transmitters each having two contacting areas at both ends, which contacting areas are held in firm engagement with adjoining projections.

12. In combination, a hub, a wheel, bolts demountably securing the wheel to the hub, means for relieving the bolts of driving stresses comprising tubular projections on the hub extending loosely through the wheel and tubular projections on the wheel lying between those on the hub, and torque transmitters loosely mounted substantially centrally of the bolts inside of nuts on the bolts, and expanded by said nuts so that the outer ends of each clamp tightly grip two adjoining projections.

13. In a wheel, a hub and a wheel body, and means for fastening the wheel to the hub comprising bolts and torque transmitting members associated with the bolts and in engagement with both the hub and the wheel body, said torque transmitting members being under tension when the nuts on the bolts are tightened.

OSCAR U. ZERK.

CERTIFICATE OF CORRECTION.

Patent No. 1,937,051.　　　　　　　　　　　　November 28, 1933.

OSCAR U. ZERK.

It is hereby certified that error appears in the printed specification of the above numbered patent requiring correction as follows: Page 6, line 13, claim 10, for "other" read outer; and that the said Letters Patent should be read with this correction therein that the same may conform to the record of the case in the Patent Office.

Signed and sealed this 9th day of January, A. D. 1934.

F. M. Hopkins (Seal)　　　　　　　　　　　　　　　　　Acting Commissioner of Patents.

CERTIFICATE OF CORRECTION.

Patent No. 1,937,051.  November 28, 1933.

OSCAR U. ZERK.

It is hereby certified that error appears in the printed specification of the above numbered patent requiring correction as follows: Page 6, line 13, claim 10, for "other" read outer; and that the said Letters Patent should be read with this correction therein that the same may conform to the record of the case in the Patent Office.

Signed and sealed this 9th day of January, A. D. 1934.

F. M. Hopkins (Seal)  Acting Commissioner of Patents.